Aug. 14, 1956     D. C. CARLSON     2,758,458
BIRTHDAY CAKE COVER WITH BASE
Filed May 14, 1954
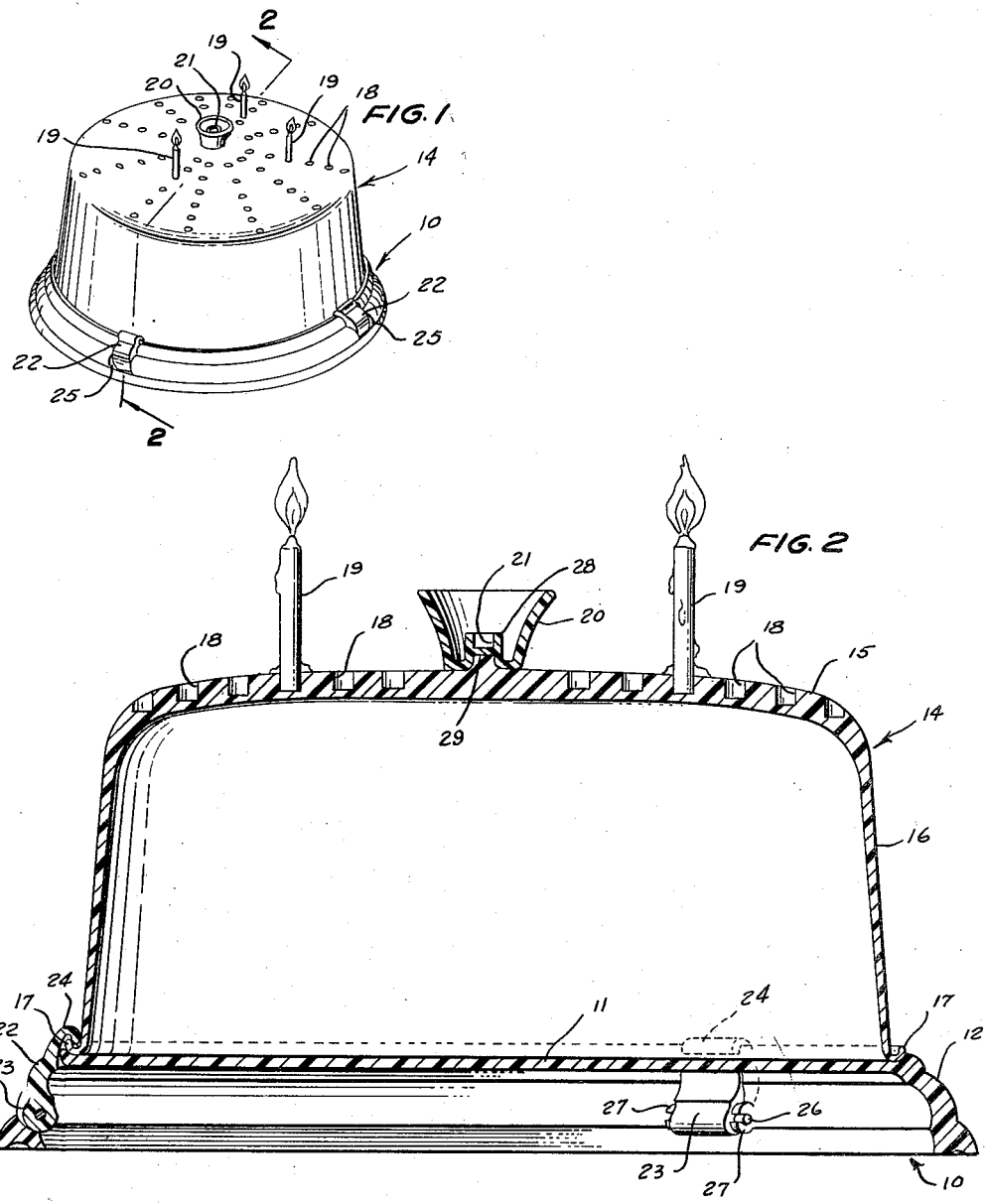
INVENTOR.
DEWAYNE C. CARLSON
BY
McMorrow, Berman + Davidson
ATTORNEYS

United States Patent Office 2,758,458
Patented Aug. 14, 1956

2,758,458

BIRTHDAY CAKE COVER WITH BASE

Dewayne C. Carlson, Rapid City, S. Dak., assignor of one-third to Otto W. Jensen and Beatrice E. Jensen, Sorum, S. Dak., jointly Application May 14, 1954, Serial No. 429,910

2 Claims. (Cl. 65—59)

This invention relates to food protective receptacles, particularly to a receptacle adapted to hold a birthday cake.

An object of the invention is to provide a food protective receptacle which will keep the food deposited therein clean and fresh and prevent it from drying out.

Another object of the invention is to provide a food protective receptacle which will prevent flies and other insects from reaching the food.

Another object of the invention is to provide a food protective receptacle which is easy to carry or store.

In addition to the foregoing, the receptacle of the present invention has the following particular objects and advantages when used as a receptacle for a birthday cake: It prevents candle wax from dripping on the cake or the cake frosting as the candles burn; it prevents the frosting from being crushed or broken by the placing of candles on it; it prevents germs from the mouth from being spread over the cake when the candles are blown out; and it permits the cake and all the decorations thereon to be seen although protectively covered.

Other objects and advantages of the invention will appear from the following description considered in conjunction with the attached drawings, in which:

Figure 1 is a perspective view of the receptacle of the present invention with birthday candles mounted thereon.

Figure 2 is a view taken along the line 2—2 of Figure 1, on an enlarged scale.

Referring now to the drawings in more detail, the reference numeral 10 designates a base adapted to support a food article. The base 10 consists of a flat, raised surface 11, upon which a food article such as a cake may be supported, and a depending flange 12 extending about the margin of the surface 11 and upon which the base 10 rests.

Resting upon the base 10 and adapted to cover food articles supported on the base 10, is a cover, generally designated 14. The cover 14 embodies a top portion 15, spaced above the base 10, and a wall 16 depending about the margin of the top portion 15 and resting upon the surface 11 of the base 10. The lower portion of the cover wall 16 is curled outwardly and upwardly to form a curled lip 17. The top portion 15 is provided with a plurality of spaced indentations 18, each indentation 18 being adapted to conformably receive one end of a candle 19 to hold the candle 19 in an upright position upon the top portion 15. The top portion 15 is also provided with an upwardly opening, cup-shaped, upwardly flaring knob 20 which is centrally formed with an upwardly projecting boss 28 having a downwardly opening recess 29 at its lower end receiving an upstanding projection of top portion 15. At its upper end, the boss 28 has a candle receiving indentation 21 in its center. The cover 14 may be made of any suitable material but is preferably made of transparent plastic so that the food article within the receptacle may be readily seen from the outside.

Arranged in spaced relation about the base 10, is a plurality of hook-shaped members 22, each having its shank end 23 pivotally connected to the base 10 and its hooked end 24 detachably engageable with the adjacent portion of the curled lip 17 of the cover 14 to secure the cover 14 to the base 10. Each hook-shaped member 22 is positioned in a slot 25 cut in the base 10, a pin 26 projecting exteriorly from each side of the shank end of the member 22 being rotatably supported in a bearing member 27 extending inwardly of the base 10 to each side of the slot 25.

It will be readily seen from the foregoing description that when the hook-shaped members 22 are rotated away from their position of engagement with the lip 17, the cover 14 may be raised by means of the knob 20 and an article of food, for example, a birthday cake may be placed upon the surface 11 of the base 10. The top 14 may then be placed back in its position upon the base 10 and in that position will cover the article resting upon the surface 11. If the members 22 are then rotated toward the cover 14 and the hooks 24 engaged with the lip 17, the cover 14 will be held firmly upon the base 10 and the entire receptacle may now be raised and moved about by grasping the knob 20. While the food article, or cake, will be completely enclosed, if the cover 14 is made of transparent material, the food article will be completely visible. When the receptacle is used to enclose a birthday cake, all the colors and decorations of the cake will be visible through the cover 14. Moreover, the birthday candles in appropriate number and arrangement may be inserted in the indentations 18 so that they stand upright upon the top 15 of the cover 14. The cake will thus have all of the appearance desired of a birthday cake without being subject to the disadvantages of having the candles inserted into the frosting, which so often results in cracking or crushing the frosting or the cake itself, of having the melted candle grease run down and render a portion of the frosting inedible, and of having the whole upper surface of the cake sprayed with saliva when the candles are blown out. The receptacle thus not only protects the appearance and integrity of the cake but also keeps it fresh and provides a convenient means for carrying it from place to place and storing remaining portions of it until they are eaten.

What is claimed is:

1. A protective covering for cakes comprising a base having a flat, raised surface for supporting a cake; and a cover removably supported upon the base, said cover including a top portion spaced above said surface, said cover further including a depending, circumferential wall on the margin of the top portion, said wall seating at its lower edge upon said surface of the base, said top portion being formed with a plurality of spaced upwardly opening indentations spaced radially of the top portion and adapted to receive candles to hold the same in upright positions upon the top portion, said indentations terminating at their inner, lower ends short of the underside of the top portion, said top portion comprising the sole thickness of material of the cover above the base, the inner, lower end of each of the indentations being disposed in a plane lower than the plane of any indentation closer to the center of the top portion.

2. A protective covering for cakes comprising a base for supporting a cake; a cover removably supported upon the base, said cover including a top portion spaced above the base, the cover further including a depending, circumferential wall on the margin of the top portion seating at its lower edge upon the base, said top portion being formed centrally thereof with an upstanding projection; and a knob centrally disposed upon the top portion and providing a handle, said knob being of upwardly opening, flared formation and including at its center and upwardly projecting boss the lower end of which is formed with a downwardly opening recess receiving said projection, said boss at its upper end having an upwardly opening recess adapted to receive a birthday candle.

References Cited in the file of this patent

UNITED STATES PATENTS

| | | | |
|---|---|---|---|
| D. 28,261 | Bowers | Feb. 8, | 1898 |
| 24,764 | Shaler | July 12, | 1859 |
| 293,074 | Pecor | Feb. 5, | 1884 |
| 674,457 | Earl | May 21, | 1901 |
| 1,125,855 | Mapes | Jan. 19, | 1915 |
| 1,206,569 | Marsh | Nov. 28, | 1916 |
| 1,288,313 | Waibel | Dec. 17, | 1918 |
| 1,452,558 | Jackson | Apr. 24, | 1923 |
| 1,516,582 | Spalding | Nov. 25, | 1924 |
| 1,863,790 | Hermani | June 21, | 1932 |
| 1,863,793 | Hermani | June 21, | 1932 |
| 1,935,831 | Cunningham | Nov. 21, | 1933 |
| 2,061,957 | Brown | Nov. 24, | 1936 |

FOREIGN PATENTS

| | | | |
|---|---|---|---|
| 317,698 | France | May 31, | 1902 |
| 14,486 | Great Britain | June 21, | 1909 |